United States Patent Office 3,102,550
Patented Sept. 3, 1963

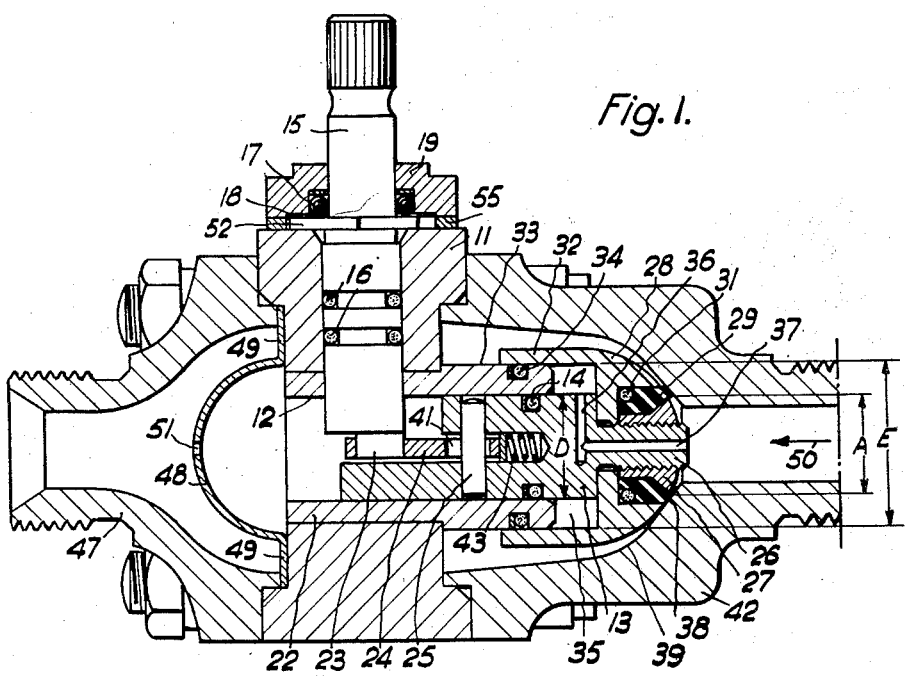
Fig. 1.
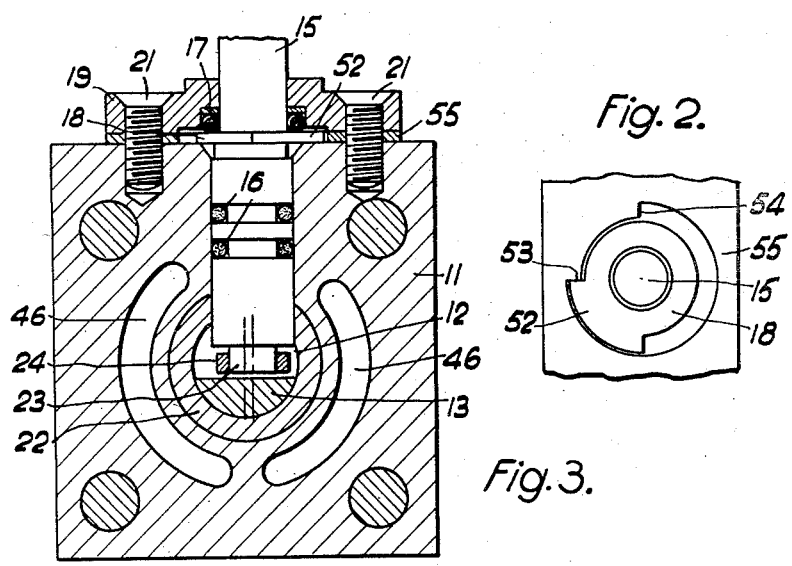
Fig. 2.
Fig. 3.
INVENTOR
Stanley Grapes Shand
& Arthur Cyril Gower
BY A. E. Odell
ATTORNEY

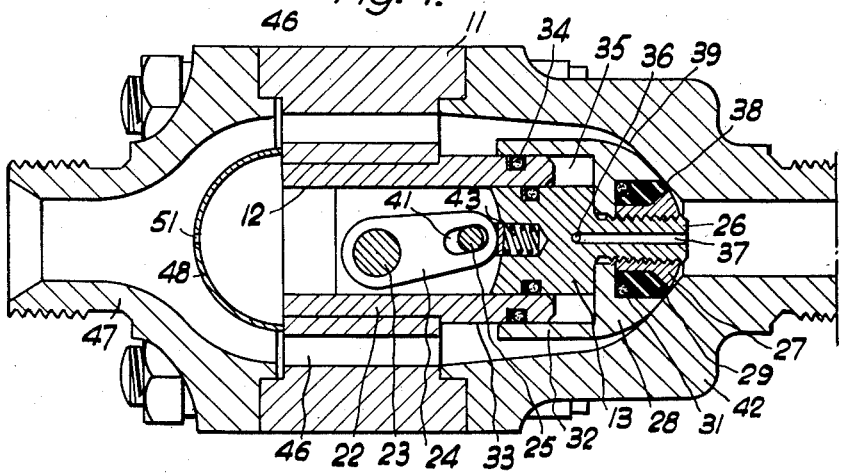

3,102,550
FLUID CONTROLLING VALVES
Stanley G. Shand and Arthur C. Gower, Hereford, England, assignors to Saunders Valve Company Limited, Cwmbran, Monmouthshire, England, a British company
Original application May 26, 1955, Ser. No. 511,184, now Patent No. 2,962,039, dated Nov. 29, 1960. Divided and this application Sept. 16, 1960, Ser. No. 56,440
Claims priority, application Great Britain May 27, 1954
8 Claims. (Cl. 137—219)

This invention relates to valves for the control of fluids. An object of the invention is to provide a valve which can be used to control fluids at very high pressures, say up to 4,000 lbs. per square inch, by means exerting only a moderate torque. The need arises, for example, on aircraft to control such valves from remote points by means of mechanical controls or comparatively small geared electric motors.

In the valve with which the invention is concerned, the moving closure member is carried by a movable member which is moved by operating mechanism but has some freedom of motion in relation to the mechanism under spring bias towards the closed position, the freedom of motion being in part taken up against the spring bias after the valve is closed, so that no great manufacturing precision is necessary in the dimensions of the parts, and the controlled (i.e. inlet or line) fluid pressure has access to a chamber in part bounded by a surface on the back of the movable member having an area so related to the area within the seating with which the closure member co-operates that when the valve is closed the closing pressure is derived mainly from the controlled fluid pressure, while when the mechanism is operated to open the valve, after the freedom of motion has been taken up the mechanism positively withdraws the movable member.

To avoid the operating mechanism having to pass from the outside of the valve casing into the space to which the line pressure has access when the valve is closed, and thus to reduce the risk of leakage, according to the invention the movable member which carries the closure member has a sliding fit in relation to the casing of the valve, and has two seals between itself and the casing, one located between the operating mechanism and said chamber to which the controlled fluid pressure has access and the other between said chamber and the outlet of the valve. Thus, apart from any fluid which may leak past the former seal, the fluid does not have access to the mechanism when the valve is closed.

A convenient arrangement of movable member comprises a central piston body sliding fluid tight within an axial bore, to which body the operating mechanism is linked, a head on the piston body, and a skirt extending back from the head and sliding over a cylindrical surface on the valve casing, the controlled fluid passage passing outside the skirt and said cylindrical surface, a further passage being provided in the piston body open to the controlled fluid pressure at all times at one end and opening at the other into the chamber formed between the piston body, the back of the head and the skirt. When the valve is closed, the fluid tight joint between the piston body and the bore in which it slides prevents access of the fluid pressure from the chamber to the operating mechanism, and the fluid tight joint between the skirt and the cylindrical surface prevents escape of fluid from the chamber to the downstream side of the closure member. When the valve is opened the fluid is simply displaced from the said chamber, back through the said further passage.

With this construction of the movable member, the operating mechanism can conveniently comprise a spindle which passes through the wall of the valve casing at right angles to the bore in which the piston body slides. The controlled fluid passage can then continue by arcuate slots through the valve casing clear of the spindle.

The operating mechanism may be checked just beyond a dead centre position when the valve is closed, so that the mechanism will be held by the spring bias in this position. The freedom of motion enables the operating mechanism to pass beyond the dead centre, leaving the closure member in its closed position under the controlled fluid pressure. Desirably, one of the two members at which the actual closure of the valve is effected is resilient, to ensure a good joint when the valve is closed. The resilient member may be the closure member carried by the movable member, the seating itself being a metal surface in the valve casing.

The freedom of movement allows for the slight compressibility of the resilient member.

Experience has shown that the resilience of the closure member should not be too high otherwise the high-pressure fluid tends to extrude it. A suitable material provided the fluid to be controlled is not such as will attack it chemically or tend to dissolve it is a fairly hard grade of india rubber having sufficient resilience to ensure a good seal but hard enough to prevent extrusion. Generally valves of the kind in question are used to control an inert gas such as nitrogen or a fairly inert gas such as air so that hard rubber is quite suitable. The use of the valve is not confined to inert gases or air, however, as by choice of a suitable resilient material, for example a suitable grade of synthetic rubber, the valve can be used for the control of other gases, oils, liquid fuels, or the liquids used in hydraulic apparatus. With a suitable non-inflammable lubricant it could also be used for oxygen under pressure.

The invention will be further described with reference to the accompanying drawings which show one preferred construction embodying the invention:

FIG. 1 is an axial section showing the valve closed;
FIG. 2 is a detail plan view;
FIG. 3 is a cross-section of FIG. 1;
FIG. 4 is a longitudinal section taken at right angles to FIG. 1 with the valve closed; and
FIG. 5 is a similar section to FIG. 4 but with the valve open.

In the construction illustrated the valve body 11 has a transverse bore 12 in which works a central sliding piston body 13 sealed in the bore by one or more O-rings 14. An operating spindle 15 is journalled in a bore in the body at right-angles to the bore 12 and is desirably sealed therein by O-rings 16 in grooves. In view of the high end pressure which may arise on the spindle, ball bearings 17 are interposed between a shoulder 18 on the spindle and an external collar 19 held by screws 21. For convenience the bore 12 is formed in a part 22 made separately from the body 11 and afterwards fitted therein, the spindle 15 retaining it in place. The inner end of the spindle 15 has an eccentrically located projecting crank pin 23 entering a bore at one end of a short connecting rod 24, the other end of which has a slot 41 engaging over a pivot pin 25 in the piston body 13. The slot 41 makes the effective length of the connecting rod, i.e. the distance apart of the pins 23, 25, variable and provides a corresponding amount of freedom of movement between the operating mechanism comprising the spindle 15, crank pin 23 and connecting rod 24, and the piston of which the body 13 forms part. A spring 43 biases the piston body to the right in FIGS. 1, 4 and 5, that is, the closing direction of the valve.

The piston body 13 has a spigot 26 at its end remote from the connecting rod, projecting from the bore 12 and threaded to receive a shouldered nut 27 which holds in place a piston head 28 and between the head and the nut an annular closure member 29 of a material of sufficient resilience to make a good seal, for example, a fairly hard rubber. The closure member 29 is provided with an O-ring 31 to seal it to the head 28, thus preventing leakage along its outer surface, and its end surface projects a little from the surface defined by the nut 27 and the head 28. The head has a skirt 32 which works over a machined surface 33 of the part 22 projecting from the body and it is sealed by the aid of one or more O-rings 34 in grooves. There is thus formed between the piston body 13, head 28 and skirt 32, on one hand and the end of the part 22 on the other an annular chamber 35 bounded in part by a surface on the back of the head 28 and this communicates through a radial passage 36 with an axial passage 37 opening in the end of the spigot 26.

The closure member 29 co-operates with a seating surface 38 formed at the inner end of a cup-shaped recess 39 in an inlet fitting 42 secured to one side of the valve body and having a pipe connection formed on it. A pair of arcuate passages 46 pass through the body 11 so as to clear the spindle and other working parts and they form a communication between the recess 39 and an outlet fitting 47 on the other side of the body, which tapers down to a suitable pipe connection. The passage at this side may be faired off to improve the flow by a hemispherical or similar dome 48 secured to the side of the body 11. The dome may be held by lugs 49 between the body 11 and the outlet end fitting 47. The two end fittings 42, 47 may be spigoted into the body 11. An aperture 51 in the dome 48 prevents trapping of any fluid leaking past the piston body 13. The body 11, part 22 and fittings 42, 47 constitute the casing of the valve.

The fluid flow is in the direction of the arrow 50 in FIG. 1. When the valve is closed, the fluid pressure on the inlet side through the passages 37, 36 acts within the chamber 35 and the parts are dimensioned so that in this position some of the freedom of movement provided by the slot 41 is still not taken up to the right (FIGURES 1 and 4).

The fluid pressure within the chamber 35 acts to urge the assembly 13, 28, 27, 29, 31 constituting the movable member of the valve in the closing direction, that is to the right in FIG. 1 and is effective over the area of the annulus between the diameter D of the piston body 13 and the internal diameter E of the skirt 32, while the total fluid pressure acting to urge the movable member in the opposite i.e. opening direction is that acting on a circular area of diameter A within the closure member 29. The area of the annulus between the diameters D and E is made greater than the area of the circle of diameter A so that the net axial force due to fluid pressure acts in the closing direction and is equal to the difference in these areas multiplied by the fluid pressure. Since there is still freedom of movement available to the right, this axial closing force is unaffected by the operating mechanism. Ignoring the spring 43, this axial force also determines the load on the connecting rod 24 and therefore the torque on the spindle 15 necessary to start opening the valve. By suitable choice of the diameters D and E in relation to the diameter A the closing pressure and the torque to start opening the valve can be given any desired value in relation to the line pressure. It is preferred to make the diameters D and E such that the pressure load urging the movable member to the right when closed only slightly overbalances the pressure load acting in the opposite direction.

The rotation of the spindle 15 is limited to about 180°, the spindle rotating counterclockwise as seen in FIGS. 2 and 4 to open the valve and the parts are so proportioned that in the extreme position of the spindle with the valve closed, the crank pin 23 is just over dead-centre (see FIG. 4), when the spring 43 will hold the operating mechanism as set although the mechanism is not now directly contributing to the closing pressure on the movable member. In this position the pressure of the spring is added to the fluid pressure acting on the back of the head 28 but it will usually be negligible if the line pressure is high.

Any convenient means for limiting the rotation of the spindle may be provided and may be included in the external operating mechanism or in the construction of the valve itself. As shown in FIG. 2 of the illustrated example the shoulder 18 has a projecting part 52 which co-operates with shoulders 53, 54 formed in a plate 55 held between the collar 19 and the valve body. An advantage of the particular operating mechanism shown is that in the first phase of opening, even after the free movement provided by the slot 41 has been taken up, the crank-pin and connecting rod are working with a very high mechanical advantage so that even if the fluid pressure holding the valve closed is high the valve can be opened by the exertion of a small torque on the spindle. After the freedom of movement has been taken up the valve starts to open. Once the valve has started to open the line pressure acting in the opening direction is no longer confined to the area within the diameter A and there is no longer any question of the pressure in the annular chamber 35 acting to overcome the tendency of the line pressure to open the valve. As the spindle continues to be turned to retract the movable member the fluid in the annular chamber 35 simply passes back through the passages 36, 37 into the line and the fluid flows between the head 28 and the inside of the fitting 42 and thus through the passages 46 through the body 11 and out through the end connection 47.

As above mentioned, the provision of freedom of movement between the operating mechanism and the movable member also affords reasonable manufacturing tolerances, since it avoids the need for very high precision in the dimensions and location of the parts when the valve is closed. It also provides for the slight compressibility of the member 29 and also for the very minute retrograde movement of the connecting rod involved by carrying the operating mechanism over-centre when the valve is closed.

The slot 41 provides positive stops to limit the variation in effective length of the connecting rod and there is therefore no possibility of the movable member not being positively retracted when the spindle is turned to open the valve.

A minor modification possible in the form of valve illustrated would be to mount the resilient closure member in the recess 39 and have the seating surface on the piston head 28.

This application is a division of our application Serial No. 511,184, filed May 26, 1955, now Patent Number 2,962,039.

What we claim is:

1. A fluid control valve comprising a casing having an inlet and an outlet joined by a passage, a movable member including a piston body slidable fluid tightly within a bore in the casing towards and away from the inlet, a head on said piston body at the end nearer the inlet, and a skirt extending back from the head, a cylindrical surface in the valve casing over which the skirt slides, thereby to form a chamber between the piston body, the back of the head, and the skirt, the passage joining the inlet and outlet passing outside the skirt and cylindrical surface, a further passage leading through the movable member from the chamber and opening at all times to the inlet to the casing, two sealing members carried respectively by said head and said casing around the inlet, one of said sealing members being a resilient closure member and the other a seating, operating mechanism actuatable from outside the casing for moving the movable member, means linking the mechanism and movable member with some freedom of motion, spring means acting between the mechanism and movable member to bias the movable member towards the inlet, the movement imparted by the mechanism in the closing direction being sufficient to take up in part the freedom of motion against the spring bias after the sealing members have come into contact, a seal between said operating mechanism and said piston body, and a seal between said skirt and the passage passing outside the skirt, thereby confining the fluid pressure to the chamber without preventing the operation of the mechanism or the movement of the movable member, the area of the back of said head bounding the chamber being so related to the area within the seating with which the closure member cooperates that when the valve is closed, the closing pressure not substantially exceeding the pressure of the fluid tending to open the valve and is mainly derived from the controlled fluid pressure acting in said chamber, while when the mechanism is operated to open the valve, after the freedom of motion has been taken up the mechanism positively withdraws the movable member.

2. A fluid control valve according to claim 1 in which said valve casing is straight and the bore in which the piston body slides is axially disposed in the casing.

3. A fluid control valve according to claim 1 in which the operating mechanism comprises a spindle which passes through the wall of the valve casing at right angles to the bore in which the piston body slides.

4. A fluid control valve according to claim 3 in which the controlled fluid passage is continued by arcuate slots through the valve casing clear of the spindle.

5. A fluid control valve according to claim 4 also comprising an outlet fitting into which the arcuate slots open, and a passage-fairing dome covering the bore in which the piston body slides.

6. A fluid control valve according to claim 1 in which the operating mechanism reaches a dead centre position when the valve is closed, and the valve also comprises means for checking the mechanism just beyond said dead centre position.

7. A fluid control valve according to claim 1 in which the operating mechanism also includes an eccentrically located crank pin on the end of the spindle, and the linking means comprises a connecting rod of variable effective length pivoted at one end on the crank pin and connected at the other end to the piston body.

8. A fluid control valve according to claim 7 also comprising projections on the spindle and shoulders on the valve casing cooperating with said projections to limit the rotation of the spindle, the projections and shoulders being located so that the rotation is limited to about 180°, one of the end positions corresponding to the closed position of the valve with the crank pin over the dead centre.

References Cited in the file of this patent

UNITED STATES PATENTS

| | | |
|---|---|---|
| 652,495 | Terry | June 26, 1900 |
| 998,585 | Milner | July 18, 1911 |
| 1,359,521 | Mueller | Nov. 23, 1920 |
| 2,266,485 | Williams | Dec. 16, 1941 |
| 2,297,082 | Staats | Sept. 29, 1942 |
| 2,341,018 | Clapp | Feb. 8, 1944 |
| 2,364,907 | Mattimore | Dec. 12, 1944 |
| 2,495,081 | Thomas | Jan. 17, 1950 |
| 2,630,292 | Skweir | Mar. 3, 1953 |